No. 745,124. PATENTED NOV. 24, 1903.
T. L. VALERIUS.
MILK OR CREAM VAT.
APPLICATION FILED JAN. 24, 1903.
NO MODEL.
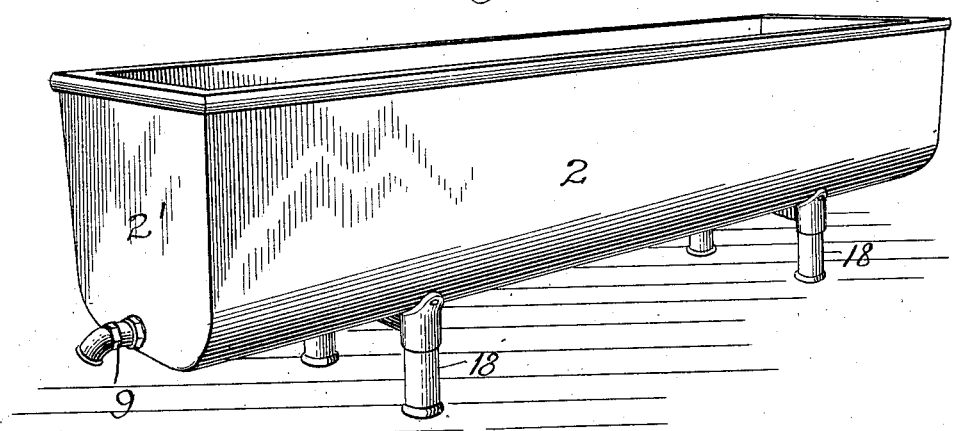
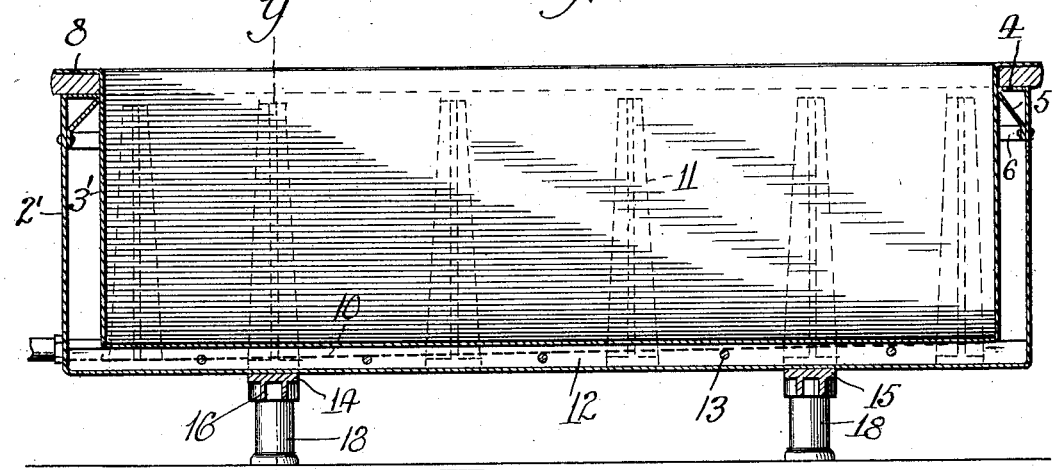
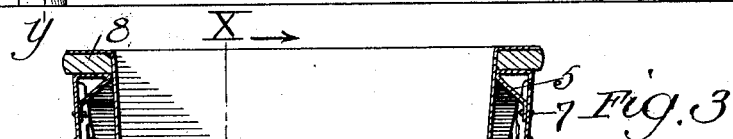

No. 745,124. Patented November 24, 1903.

UNITED STATES PATENT OFFICE.

THEODORE L. VALERIUS, OF FORT ATKINSON, WISCONSIN, ASSIGNOR TO CREAMERY PACKAGE MANUFACTURING COMPANY, OF CHICAGO, ILLINOIS, A CORPORATION OF ILLINOIS.

MILK OR CREAM VAT.

SPECIFICATION forming part of Letters Patent No. 745,124, dated November 24, 1903.

Application filed January 24, 1903. Serial No. 140,394. (No model.)

*To all whom it may concern:*

Be it known that I, THEODORE L. VALERIUS, a citizen of the United States, residing at Fort Atkinson, Jefferson county, Wisconsin, have invented certain new and useful Improvements in Milk or Cream Vats, of which the following is a specification.

This invention relates to milk and cream vats. Such vats are usually made of wood, with metal linings, and the objection to them is that they are short-lived and also cannot be kept clean without a great amount of work being expended upon them. The wooden vats become foul and dirty after a few months' use and, furthermore, because of their great size and weight when filled are usually placed upon the floor of the creamery, so that it is quite impossible to keep the floor clean under such a vat.

The object of my invention is to provide an all-metal cream and milk vat which shall be perfectly rigid, very strong and durable, and shall be of neat appearance, with surfaces that may be easily kept clean.

Another object of my invention is to provide a large cream-vat which shall be provided with legs for supporting it above the floor, so that the floor beneath it may be made cleanly.

Another and particular object of my invention is to provide a metallic vat of very simple and cheap construction whereby in cost the same will be within the reach of all those who could afford a wooden vat of like capacity.

My invention consists generally in a milk and cream vat of the construction and combination of parts hereinafter described, and particularly pointed out in the claims.

The invention will be more readily understood by reference to the accompanying drawings, in which—

Figure 1 is a perspective view of a milk and cream vat embodying my invention. Fig. 2 is a longitudinal vertical section on the line x x of Fig. 3, and Fig. 3 is a transverse vertical section on the line y y of Fig. 2.

As shown in the drawings, the main parts of my vat are the outer casing 2 and the inner lining 3. Both parts are rounded at the lower corners and are flat at the bottom, the sides being flared toward the top. The ends 2' and 3' of the casing and lining are preferably straight vertical ends. The upper edges of the casing 2, which is of sheet metal, are bent inwardly at right angles, forming the top or rim 4. From the inner edge of this rim the sheet metal is bent downwardly and meets the inner wall of the casing at an angle, as shown by the portion 5. The extreme edge serves as a flange 6, which is secured by rivets 7. The entire top of the casing is thus surrounded and strengthened by an integral girder that is triangular in cross-section. The girder is mitered at the corners of the casing, the metal being lapped, riveted, and soldered to make very strong corners for the vat. A wooden rail 8 rests upon the girder or rim of the casing, and the lining 3 is suspended from this rail 8. The rail need not be secured to the girder-top of the casing, and the lining may therefore be easily lifted out of the casing as soon as the outlet-pipe 9, which extends through the casing, is disconnected. This outlet-pipe communicates with the slanting trough or groove 10, that is provided in the bottom of the lining 3. These tanks as usually constructed are intended to contain several tons of milk or cream, and it is obvious that the vertical walls of the lining would not sustain such weight. To strengthen the casing and impart rigidity thereto, I employ a large number of metal knees or braces 11 within the lining. These knees or braces are curved to conform to the bottom of the casing and are preferably of less height in cross-section than the space between the lining and the casing, so that the lining does not rest upon the knees. Said parts 11 extend upward to the top of the casing, their ends being preferably extended through holes in the angular or brace portions of the top girder. The lower ends of the opposite knees do not meet, but are separated by considerable spaces across the bottom of the vat. This space is occupied by a number of metal or wooden bed timbers or rails 12, that extend from end to end of the vat and upon which the bottom of the lining rests. The parallel bed-timbers are preferably joined by short dowels or bolts 13, as shown, to hold them in place, and the outer timbers 12 are preferably notched to avoid the lower ends of the brackets or knees 11.

The vat thus far described could be placed upon a flat surface or floor; but this would be objectionable, as moisture would soon rust out the bottom of the casing. I therefore raise the vat from the floor to avoid the rusting of the vat and to leave a large space beneath the vat, which will permit the cleaning of all parts of the surface of the vat and also the floor beneath. To this end I employ the cradles 14 and 15, the upper surfaces of which conform to the bottom of the vat. These cradles are provided with ribs or trusses 16 and are also provided with the recesses or seats 17 at their ends to receive the upper ends of the legs 18. The legs 18 are preferably castings and are somewhat ornamental in design. The upper ends of the legs are formed to fit the seats 17 on the cradles, and the legs are held in place rigidly by the bolts 19, which extend up through the same into the bosses 20 upon the cradle and within the seats 17. It will be seen that the bed-timbers extend across and are supported by the cradles 14 and 15, and therefore support the weight in the vat. The brackets 10, that are opposite the cradles, are preferably firmly riveted thereto, so that, in effect, the cradles are extended to the top of the vat.

The space between the casing and the lining is water-tight to contain the cooling or heating water by which the temperature of the contents of the lining is maintained. The longitudinal channels between the bed-timbers facilitate and tend to promote the circulation of the water in the space surrounding the lining. Suitable pipes (not shown) are provided for supplying and drawing off the water from said space.

It is obvious that numerous modifications of my invention will readily suggest themselves to one skilled in the art, and I therefore do not confine my invention to the specific constructions herein shown and described.

Having thus described my invention, I claim as new and desire to secure by Letters Patent—

1. In a vat, the sheet-metal casing having the integral girder formed by bending the upper edges of the casing inwardly and thence downwardly to the inner walls of the casing, in combination, with the metal knees or braces riveted to the inner walls of said casing and having upper ends that pierce said girder; substantially as described.

2. In a vat, the combination, of the metal casing with the metal lining thereof, the strengthening-knees within the casing, the metal cradles upon the bottom of the casing and provided with seats 17, the legs 16 having their upper ends fitted to said seats and means for securing the legs; substantially as described.

3. In a milk or cream vat, the combination of a sheet-metal casing with a sheet-metal lining arranged therein, cradles whereon said casing rests, a beam within the casing and extending longitudinally thereof, and suitable strengthening-knees arranged in the lower corners of the said casing between the same and said lining, substantially as described.

4. In a milk or cream vat, the combination of the sheet-metal casing with the sheet-metal lining arranged therein and suspended from the upper edges of the casing, a longitudinal beam or beams in the bottom of the casing beneath the bottom of the lining, and a plurality of transversely-arranged knees attached to the bottom and sides of the casing, substantially as described.

5. In a milk or cream vat, the combination of the sheet-metal casing with the sheet-metal lining arranged therein and suspended from the upper edges of the casing, a longitudinal beam or beams in the bottom of the casing beneath the bottom of the lining, and a plurality of transversely-arranged knees attached to the bottom and sides of the casing, and suitable girders which strengthen the upper edges of said casing, substantially as described.

6. In a milk or cream vat, the combination of the sheet-metal casing having its upper edges strengthened by suitable girders with a vat-lining depending from said girders, suitable cradles secured to the bottom of said casing on the exterior thereof, and suitable knees secured to the inner sides of the casing and through the bottom thereof to said cradles.

7. In a milk or cream vat, the combination of a sheet-metal casing having a curved bottom with a lining depending therein, curved metal strengthening-knees secured upon the inner sides and bottom of said casing, between the same and said lining, and a plurality of longitudinal beams in the bottom of the casing whereon the bottom of said lining normally rests.

8. In a milk or cream vat, a sheet-metal casing provided with an inwardly-extending girder framing its top, a casing depending from said girder and thereby spaced away from the sides of the casing, a plurality of metal knees each secured to the side and bottom of the casing, said knees being arranged in rows on opposite sides of the casing, and a longitudinal beam arranged in the bottom of the casing and extending from end to end thereof between the rows of knees.

9. In a milk or cream vat, a sheet-metal casing provided with an inwardly-extending girder framing its top, a casing depending from said girder and thereby spaced away from the side of the casing, a plurality of metal knees each secured to the side and bottom of the casing, said knees being arranged in rows on opposite sides of the casing, and a longitudinal beam arranged in the bottom of the casing and extending from end to end thereof between the rows of knees, and the metal cradles whereon said casing rests and whereto the casing is secured.

10. In a milk or cream vat, a metal casing in combination with rows of knees arranged in the lower corners of said casing, a longitudinal beam in the bottom of the casing between the rows of knees, and the cradles secured to the bottom of the casing and to some of said knees, substantially as described.

11. In a milk or cream vat, the sheet-metal casing in combination with the cradles secured to the bottom of the casing, internal knees within the casing secured thereto and to said cradles, a longitudinal beam within the casing and supported by the cradles, and a lining provided in the casing.

12. In a milk or cream vat, a sheet-metal casing, in combination with a lining therein, the cradles having their tops curved to conform to the bottom of the casing, the curved knees provided within the casing and riveted to said cradles through the casing, and beams or girders which strengthen the casing longitudinally.

13. In a milk or cream vat, a sheet-metal casing, in combination with a sheet-metal lining arranged therein, a plurality of strengthening-knees within the casing and riveted thereto, and a plurality of cradles riveted to the exterior of the casing, substantially as described.

14. In a milk or cream vat, a sheet-metal casing provided with an integral top girder formed of integral bends of the sheet metal, in combination with means strengthening the lower part of said casing, and a suitable lining depending from said top girder.

In testimony whereof I have hereunto set my hand, this 20th day of January, 1903, in the presence of two witnesses.

THEODORE L. VALERIUS.

Witnesses:
  H. H. CURTIS,
  CHAS. W. FERRIS.